UNITED STATES PATENT OFFICE.

FRITZ E. STOCKELBACH, OF DETROIT, MICHIGAN, ASSIGNOR TO FREDERICK STEARNS & COMPANY, OF DETROIT, MICHIGAN, A CORPORATION OF MICHIGAN.

SOLIDIFIED HYDROGEN PEROXID AND PROCESS OF FORMING THE SAME.

1,051,926.  Specification of Letters Patent.  Patented Feb. 4, 1913.

No Drawing.  Application filed April 9, 1912. Serial No. 689,596.

*To all whom it may concern:*

Be it known that I, FRITZ E. STOCKELBACH, a subject of the King of Denmark, residing at Detroit, in the county of Wayne and State of Michigan, have invented certain new and useful Improvements in Solidified Hydrogen Peroxid and Processes of Forming the Same, of which the following is a specification.

The invention relates to the manufacture of solid hydrogen peroxid and consists in the novel product and process for obtaining the same as hereinafter set forth.

Heretofore, hydrogen peroxid has been combined with urea to form a solid substance, but this product is so unstable as to have no commercial value. I have discovered that by the addition of a small quantity of acetanilid a relatively stable solid substance may be obtained which when dissolved in water will form a solution of hydrogen peroxid.

As a specific instance, my process may be carried out as follows: 600 grams of urea are dissolved in 1000 grams of hydrogen peroxid from 23% to 25% in which has been dissolved 2 grams of acetanilid. The solution is filtered and evaporated to dryness *in vacuo* at a temperature not exceeding 50° C. The crystals are then powdered and dried thoroughly at 50° C. and may be made in molded tablets by the use of a mixture of benzin and alcohol as a granulating fluid, or any other non-aqueous fluid. The product thus obtained is of a stable nature and may be kept in proper condensation for a long period of time. In use it is dissolved in water to form a hydrogen peroxid solution, or if desired it may be directly used as a powder.

What I claim as my invention is:

1. As a new article of manufacture, a composition of urea, hydrogen peroxid and acetanilid.

2. The method of solidifying hydrogen peroxid which consists in dissolving in a solution of hydrogen peroxid, a small quantity of acetanilid and a large quantity of urea, and in then evaporating the solution.

3. The method of solidifying hydrogen peroxid which consists in mixing the following ingredients in substantially the proportion specified: 600 grams urea dissolved in 1000 grams hydrogen peroxid from 23 to 25% in which has been dissolved 2 grams of acetanilid, and in then evaporating the solution to dryness.

4. A new article of manufacture comprising a composition of urea, acetanilid and hydrogen peroxid in substantially the proportion of 600 grams urea, 2 grams acetanilid and 1000 grams of hydrogen peroxid solution from 23 to 25%.

In testimony whereof I affix my signature in presence of two witnesses.

FRITZ E. STOCKELBACH.

Witnesses:
JAMES P. BARRY,
MARION B. FAY.

Copies of this patent may be obtained for five cents each, by addressing the "Commissioner of Patents, Washington, D. C."